United States Patent
Brederveld et al.

(10) Patent No.: US 6,278,877 B1
(45) Date of Patent: *Aug. 21, 2001

(54) HANDOVER METHOD FOR MOBILE WIRELESS STATION

(75) Inventors: Loeke Brederveld, Meerkerk; Wilhelmus J. M. Diepstraten, Diessen; Johannes P. N. Haagh, Eindhoven; Hendrik Moelard, Maarssen; Jan Hoogendoorn, Sliedrecht, all of (NL)

(73) Assignee: Agere Systems Guardian Corporation, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/065,328

(22) Filed: May 21, 1993

(30) Foreign Application Priority Data

Jan. 8, 1993 (GB) .................................. 9300310

(51) Int. Cl.⁷ ........................................ H04B 7/00
(52) U.S. Cl. ........................ 455/434; 455/452; 455/62
(58) Field of Search .................... 455/33.1, 33.2, 455/34.1, 34.2, 54.1, 54.2, 56.1, 33.3, 33.4, 422, 434, 445, 450, 452, 62, 63, 67.1

(56) References Cited

U.S. PATENT DOCUMENTS

| | | | |
|---|---|---|---|
| 3,913,017 | * 10/1975 | Imaseki | 455/33.4 |
| 4,829,519 | * 5/1989 | Scotton et al. | |
| 5,101,503 | * 3/1992 | Furuya | 455/56.1 |
| 5,212,806 | * 5/1993 | Natarajan | 455/33.4 |
| 5,267,261 | * 11/1993 | Blakeney et al. | 455/33.1 |

FOREIGN PATENT DOCUMENTS

| | | |
|---|---|---|
| 0843544 | * 5/1992 | (EP) . |
| 0483544 | 5/1992 | (EP) . |
| 0492800 | * 7/1992 | (EP) . |
| WO14309 | 8/1992 | (WO) . |

OTHER PUBLICATIONS

Kanai et al "A Handoff Control Process for Microcellular System" 38 IEEE Vehicular Technology Conference Jun. 1988.*

* cited by examiner

Primary Examiner—Thanh Cong Le
(74) Attorney, Agent, or Firm—Oliff & Berridge, PLC

(57) ABSTRACT

A wireless local area network system includes a plurality of base stations connected in a wired local area network. A mobile wireless station can roam through communication cells defined by the base stations. The base stations transmit beacon messages at regular intervals. The mobile station determines the communications quality of the beacon message for the cell in which the mobile station is currently located and if this quality becomes unacceptable, switches to a search mode wherein beacon messages from any base station are received and their communications quality is determined. The mobile station switches to communicate with a base station providing a beacon message with an acceptable communications quality.

6 Claims, 5 Drawing Sheets

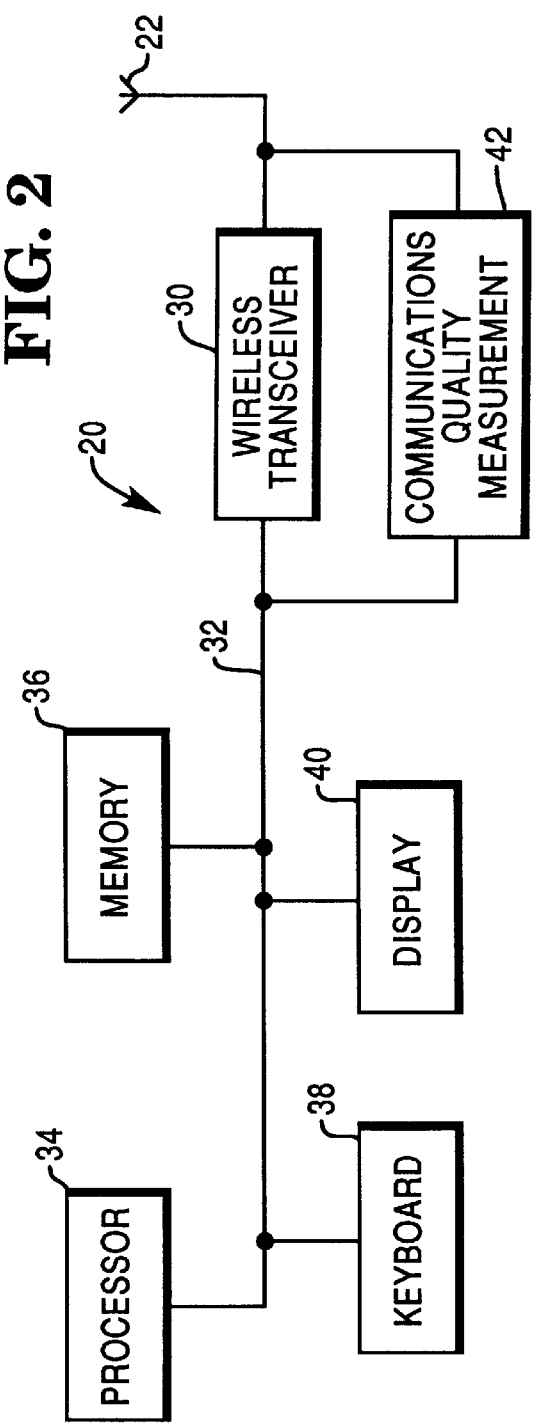
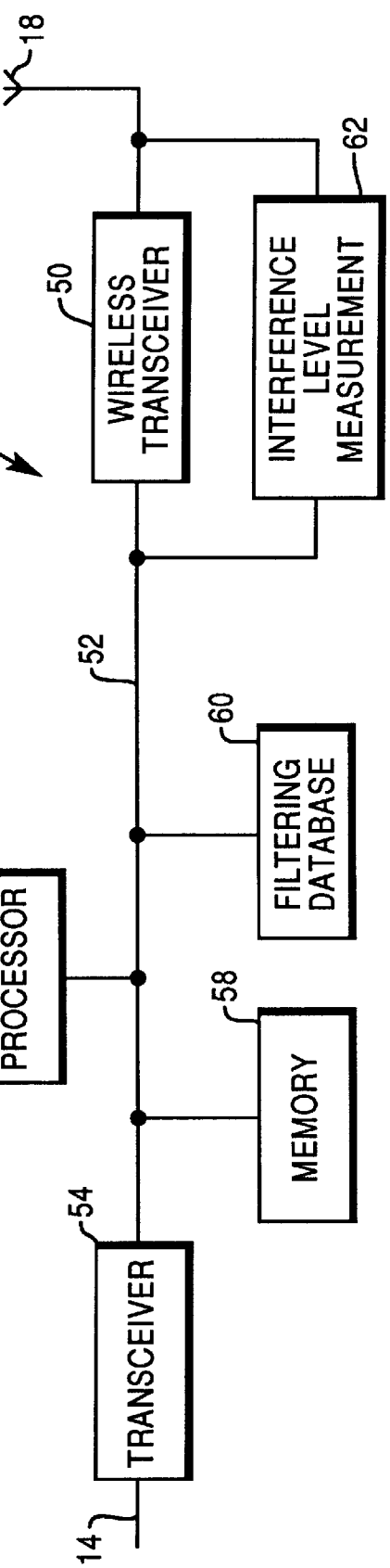

HANDOVER METHOD FOR MOBILE WIRELESS STATION

BACKGROUND OF THE INVENTION

The present invention relates to a method of operating a wireless local area network.

With a view toward obviating the need for wired cabling connections between stations in local area networks (LANs), wireless local area networks have been developed and are now commercially available. However, the coverage area of wireless LANs is restricted especially in an indoor environment, due to the presence of structural features such as walls and floors in buildings, for example. Also it may be desirable for stations in a wireless LAN to communicate with remote facilities or resources such as servers. Therefore, it has been proposed to connect the wireless LAN via interface devices to a backbone LAN such as a wired LAN, which can be connected to the remote facilities and/or other wireless LANs.

Furthermore, where a mobile wireless station, such as a portable data processing unit provided with a wireless transceiver, for example, moves around it may move in and out of the range of various interface devices connected to the backbone LAN. It is therefore necessary for the mobile station to hand over communication from one interface device to another as it moves around.

European Patent Application No. 0 483 544 discloses a wireless communications network including a plurality of mobile data stations in bidirectional communication with header stations which are connected into a wired LAN and which define communication cells. If a mobile data station crosses over from one cell to another, the mobile station determines a new header station for communications access to the wired LAN. The header stations periodically transmit broadcast messages identifying the header station and the loading factors at the header station. Using these messages a mobile station will determine all header stations that are potential owners of the mobile station and maintain in memory a list of potential owner stations. If the current owner station remains a potential owner, and the signal strength of the current owner station is acceptable, then the current owner is retained. Otherwise, the mobile station determines a new header station based on the loading factors of the potential owner stations, and, if the loading factors are equal, the signal strengths of the signals received at the mobile station. This procedure has the disadvantages of using memory space in the mobile station to maintain in memory the list of potential owner stations, and the need to constantly monitor the messages periodically transmitted by the base stations.

International Patent Application No. WO 92/19059 discloses a system which includes a cable-based network to which are attached controllers which maintain a portable device in communication with the network for data transfer. The portable unit transmits polling packets at regular intervals. Normally, a response packet is received from the current controller. If no response packet is received for a predetermined number of attempts the portable unit initiates a procedure for registering with a new controller. This procedure involves transmitting a packet from the portable unit requesting a response from any controllers, transmitting a response packet from each controller receiving the request, selecting one of the responding controllers at the portable unit according to criteria that enhance data transfer, and transmitting from the portable unit a packet identifying the selected controller to complete registration. This procedure has the disadvantage of the need for the portable unit to transmit a request packet to initiate the handover procedure.

SUMMARY OF THE INVENTION

In accordance with one embodiment of the present invention, there is provided a method of operating a local area network system which includes a plurality of base stations and a mobile station which includes the steps of (1) transmitting beacon messages from the base station at regular intervals, each beacon message including an identification of the base station transmitting the message, (2) operating the mobile station in a normal mode wherein beacon messages from a first base station only are monitored, (3) determining a communications quality value for the beacon messages from the first base station, (4) determining if the communications quality value becomes unacceptable, and if so, changing the operating mode of the mobile station to a search operating mode wherein beacon messages from any of the base stations may be monitored, (5) selecting a base station providing an acceptable communications quality value for monitored beacon messages, and (6) changing the operating mode of the mobile station to the normal station operating mode wherein beacon messages from the selected base station only are monitored.

In accordance with another embodiment of the present invention, there is provided a method of operating a wireless local area network system having a plurality of base stations which transmit beacon messages to a mobile station. The method includes the steps of (1) operating the mobile station in a normal mode wherein the mobile station monitors beacon messages from a first base station only, and (2) changing the operating mode of the mobile station to a search operating mode wherein beacon messages from any of the base stations may be monitored if a communications quality value of the beacon messages from the first base station is unacceptable.

It is therefore an object of the present invention to provide a new and useful method of operating a wireless local area network system.

It is another object of the present invention to provide an improved method of operating a wireless local area network system.

It is yet another object of the present invention to provide a method of operating a wireless local area network system wherein mobile station handover may be achieved in a simple manner.

The above and other objects, features, and advantages of the present invention will become apparent from the following description and the attached drawings.

BRIEF DESCRIPTION OF THE DRAWINGS

FIG. 2 shows a block diagram of a mobile wireless station included in the system of FIG. 1;

FIG. 3 shows a block diagram of a base station included in the system of FIG. 1;

DETAILED DESCRIPTION OF THE PREFERRED EMBODIMENT

Figure 1:
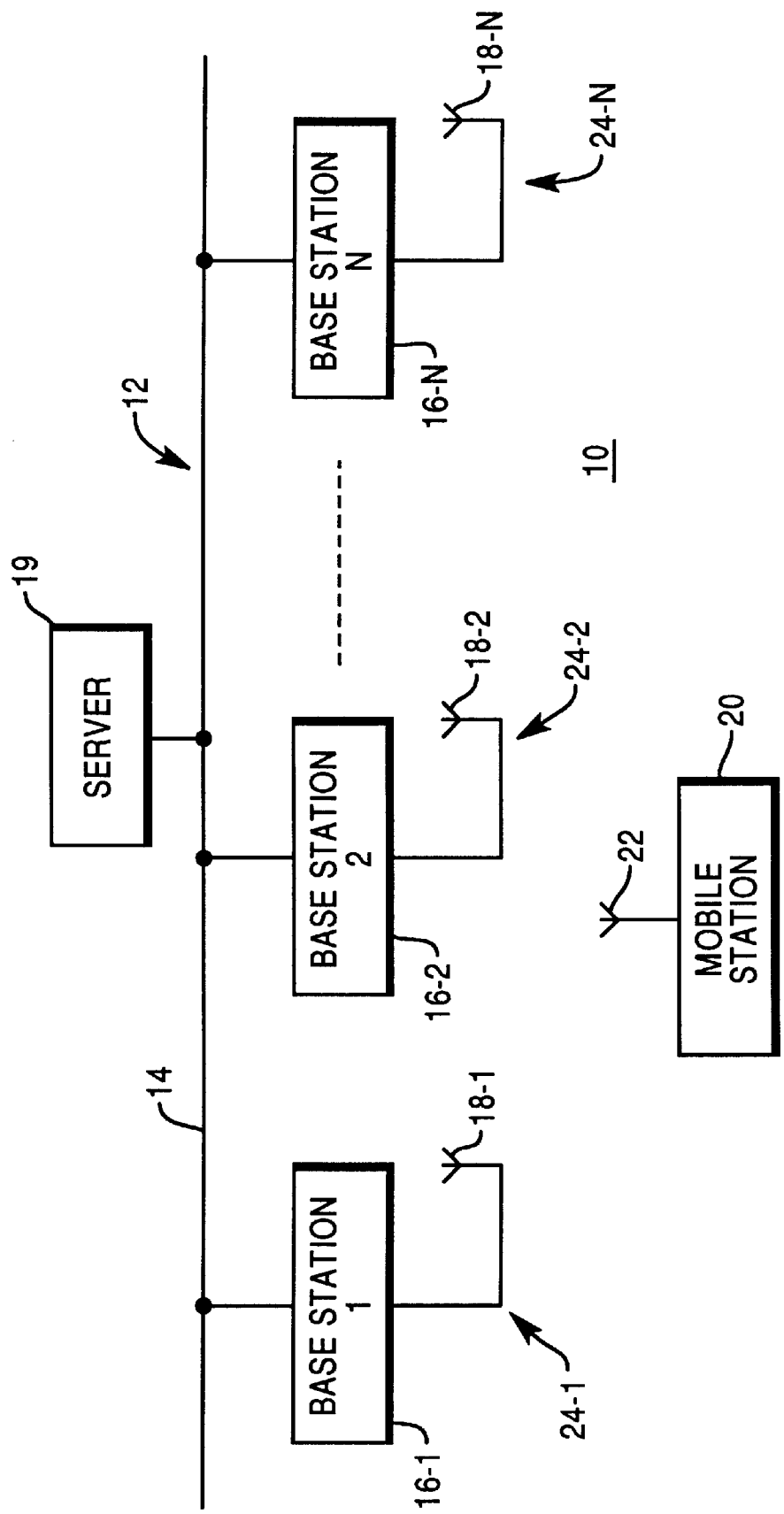
FIG. 1 shows a block diagram of a wireless LAN system in which the present invention is embodied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

Referring now to FIG. 1, there is shown a block diagram of a wireless LAN (local area network) system 10, embodying the present invention. The LAN system 10 includes a backbone LAN 12 which is a wired cable-based LAN, and which includes a cable 14 connecting a plurality of base stations 16, referenced individually as base stations 16-1, 16-2, . . . , 16-N. The base stations 16 have antennas 18, referenced individually as 18-1, 18-2, . . . , 18-N. A server 19 is connected to the cable 14 to provide a server function for devices communicating with the LAN 12. Also included in the system 10 is a mobile station 20 having an antenna 22. Of course there may be more than one mobile station operating in the system. The base stations have coverage areas, referred to as cells 24, referenced individually as cell 24-1, 24-2, . . . , 24-N.

Referring now to FIG. 2, there is shown a block diagram of the mobile station 20. The mobile station includes a wireless transceiver 30 coupled to the antenna 22 and to a bus 32. The mobile station 20 also includes, connected to the bus 32, a processor 34, a memory 36, and (optionally) a keyboard 38 and display 40. Other devices such as a printer (not shown) may be connected to the bus 32. A communications quality measurement circuit 42 is connected to the antenna 22 and to the bus 32, and is adapted to measure the communications quality of signals received on the antenna 22, as will be explained in more detail hereinafter.

Referring now to FIG. 3, there is shown a block diagram of a base station 16. The base station 16 includes a wireless transceiver 50 coupled to the antenna 18 and to a bus 52. A further transceiver 54, connected to the bus 52, connects the base station 16 to the cable 14 of the backbone LAN 12 (FIG. 1). Also connected to the bus 52 are a processor 56, a memory 58 and a filtering database 60 which stores data identifying the location of devices in the LAN system 10, in relation to the base station 16. An interference level measurement circuit 62 is connected to the antenna 18 and to the bus 52 and is adapted to measure the interference level experienced by the base station 16.

It should be understood that in operation of the LAN system 10, FIG. 1, information messages are transmitted between the mobile station 20 and the backbone LAN 12 via one of the base stations 16. It should be understood that such messages contain a network ID portion which identifies the particular cell 24 in which the message is transmitted. It will be appreciated that as the mobile station 20 moves around it may leave the coverage area of one cell 24 and enter the coverage area of a new cell 24. The present invention is concerned with a handover procedure for handing over communication from one base station 16 to another base station 16 when the mobile station 20 moves in such manner.

Figure 4:
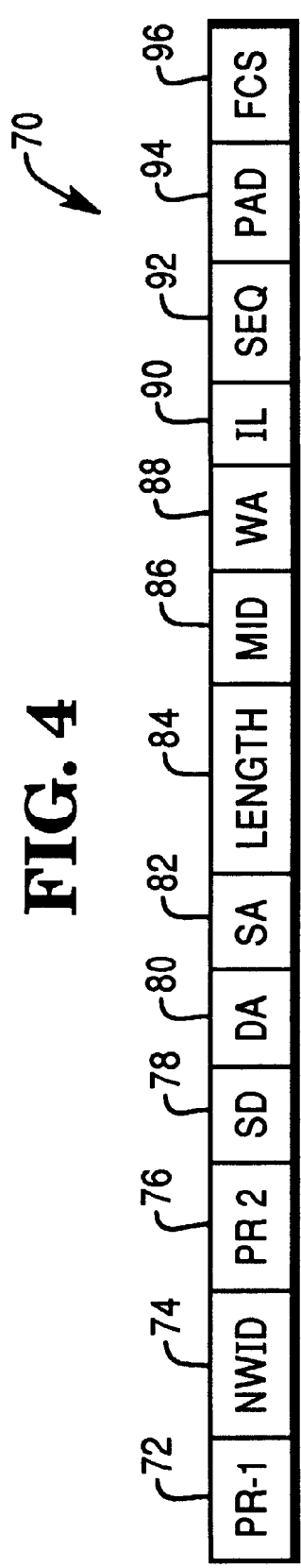
FIG. 4 shows the format of a beacon message.

In this connection, it is provided that the base stations 16 transmit beacon messages at regular intervals, for example at intervals of one second. Referring to FIG. 4, there is shown the format of such a beacon message 70. The beacon message 70 includes a first preamble portion (PR-1) 72, a network ID (NWID) portion 74, a second preamble portion (PR-2) 76, a start delimiter (SD) portion 78, a destination address (DA) portion 80, which is a broadcast address ensuring reception by any mobile station in the cell 24 covered by the base station 16 such as the mobile station 20, a source address (SA) portion 82, which is the base station address for the base station's cell 24, a length portion 84, a message identification (MID) portion 86, which identifies the message 70 as a beacon message, a wired address (WA) portion 88, which is the base station address for the wired LAN 12, an interference level (IL) portion 90, which represents the background interference (noise) level as measured by the interference level measurement circuit 62 (FIG. 3), a sequence number (SEQ) portion 92, a pad (PAD) portion 94 and a frame check (FCS) portion 96.

As mentioned hereinabove, the base stations 16 transmit beacon messages 70 at regular intervals. By arranging that the interval between successive beacon messages 70 is slightly different for each base station 16, the incidence of collisions between beacon messages is reduced. Thus station 16-1 may transmit beacon messages 70 at intervals of one second, whereas station 16-2 may transmit beacon messages at intervals of one second plus one microsecond, for example, and station 16-3 may transmit beacon messages at intervals of one second plus two microseconds, for example. With this procedure, the loss of beacon messages due to collisions is rendered very small.

Figure 5A:
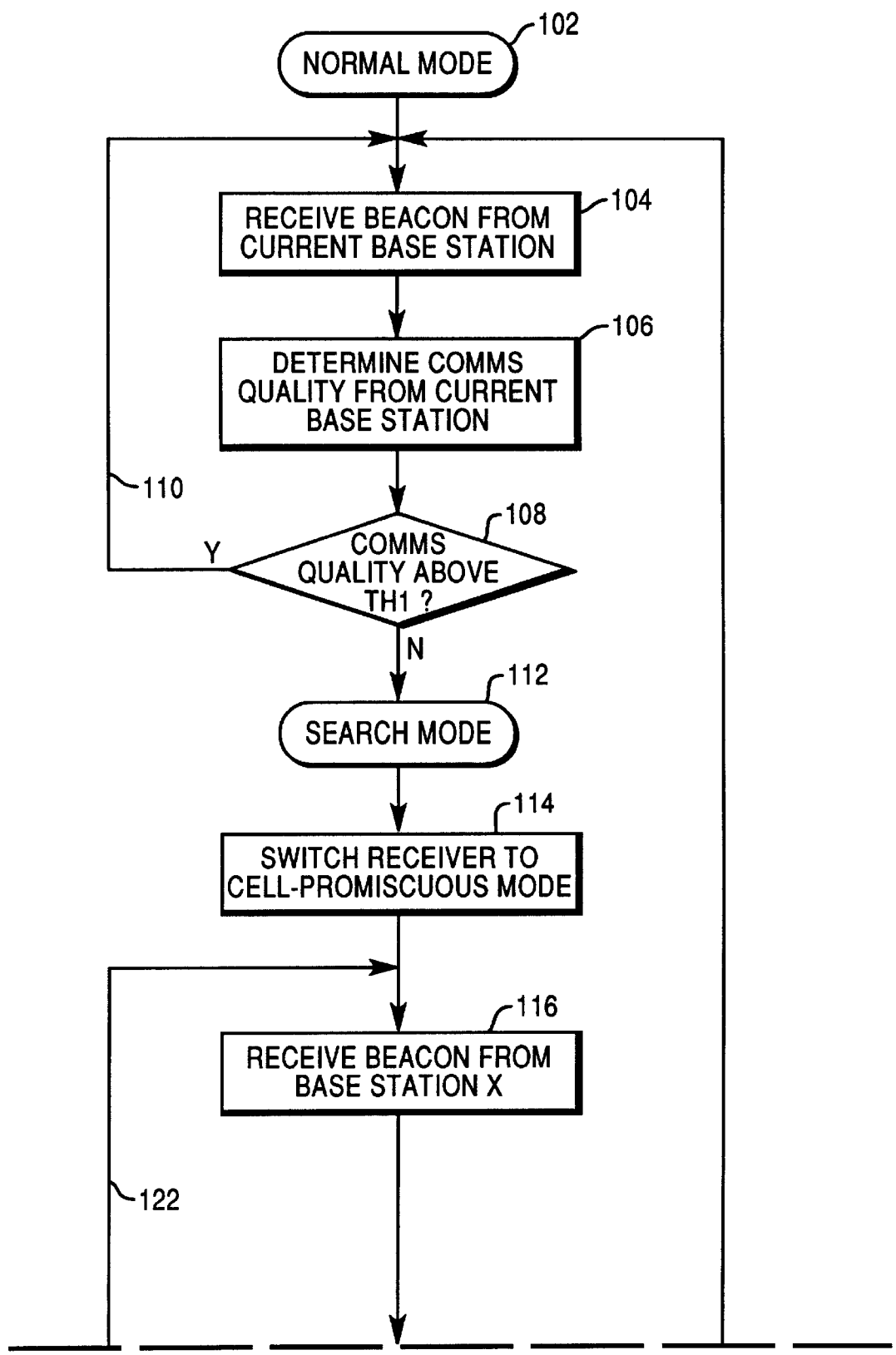
FIGS. 5A and 5B are a flowchart illustrating the operation of a mobile wireless station during a handover procedure.
Figure 5B:
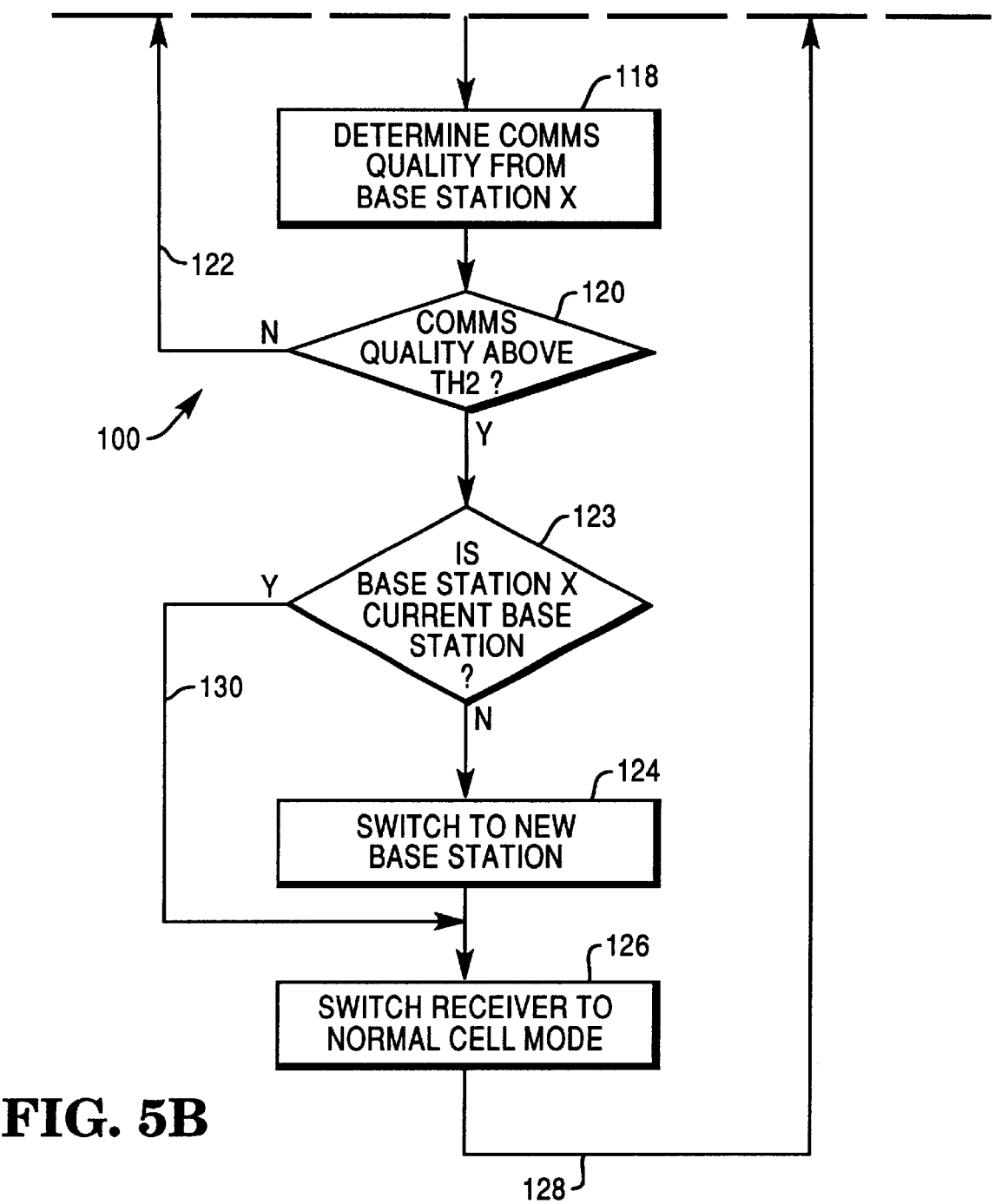

Referring now to FIGS. 5A and 5B, there is shown a flowchart 100 illustrating the operation of the mobile station 20 during a cell handover procedure. Initially, as shown in block 102, the station is operating in its normal mode, communicating with a current base station, assumed to be base station 16-1 (FIG. 1). When a beacon message is received from the current base station (block 104), the flowchart proceeds to block 106, where it is seen that the communications quality of this beacon message is determined. This measurement involves first determining the maximum of the background noise (interference) level measured at the mobile station 20 and the background noise (interference) level measured at the base station 16 and included as the IL portion 90 of the beacon message 70 received from the base station 16. The measured signal strength of the beacon message 70 at the mobile station 20 is then divided by the determined maximum noise level to provide a communications quality value based on a signal-to-noise ratio. It is then determined whether or not this communications quality value is above or below a first predetermined threshold value TH1. If above, the flowchart returns to block 104 via arrow 110. If below, the flowchart moves to block 112, which shows that the mobile station 20 changes to a search mode of operation. In the search mode of operation, the receiver portion of the transceiver (FIG. 2) switches to a so-called cell-promiscuous mode of operation, in which beacon messages from any of the base stations 16 may be received and processed. This may be achieved by ignoring the network ID portion 74 (FIG. 4) of beacon messages.

Assume, as shown in block 116, that the first beacon message 70 received by the mobile station 20 in search mode is from base station X. As shown in block 118, the communications quality of this beacon message is measured by the communications quality measurement circuit 42 (FIG. 2) as described hereinabove, by first determining the maximum of the background noise (interference) levels at the mobile station 20 and base station X, using the IL portion 90 of the beacon message 70, and then dividing the signal level value of the beacon message 70 by the thus determined maximum noise level. A determination is then made as to whether or not this communications quality value is above a second predetermined threshold value TH2 (block 120). If below, then the flowchart proceeds as shown via line 122 to block 116, and the next beacon message from a base station 16 is awaited. If above, then the flowchart proceeds to block 123 where it is determined whether the base station X is or is not the current base station. If the base station X is not the current base station, then the mobile station 20 switches to the new base station, i.e. switches to a state wherein messages having the network ID of the new base station are processed (block 124), and the receiver is returned from the cell-promiscuous mode to the normal mode (block 126). The flowchart then returns to block 104 as shown by line 128. If base station X is the current base station, the flowchart proceeds directly via line 130 to block 126, and the receiver returns to normal cell mode operation, in communication with the current base station 16.

In connection with the above-described handover operation, it should be understood that the value of TH2 is greater than the value of TH1, so that the stop cell search threshold TH2 indicates a better communications quality than the start cell search threshold TH1. This arrangement is effective as a hysteresis feature, and avoids oscillation between base stations 16 where coverage areas 24 overlap.

Many modifications to the described embodiment are possible. Thus, in a simplified arrangement, measurement of the noise level at the base stations 16 could be omitted and the beacon messages 70 (FIG. 4) transmitted without the IL portion 90. Communications quality at the mobile station 20 would then be determined on the basis of a local signal strength to local noise value ratio only. In another modification, when the mobile station is in the cell-promiscuous search mode of operation, searching for a new base station 16, a further comparison is made to determine whether the communication quality value of the current base station 16 is less than the threshold value TH1, and there is no base station 16 with a communications quality value above the stop cell search threshold value TH2. If so, then the mobile station 20 will switch over to any base station which has a communications quality value above the lower threshold value TH3. This fast cell search procedure assists in enabling the mobile station 20 to maintain communication with a base station 16 when the communications quality becomes so low that a new base station 16 has to be identified within as short a time as possible.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of operating a wireless local area network system having a plurality of base stations and a mobile station, comprising the steps of:
    transmitting beacon messages from the base stations at regular intervals, each beacon message including an identification of the respective base station transmitting that message;
    operating the mobile station in a normal mode wherein beacon messages from a first base station only are monitored;
    determining a communications quality value for the beacon messages from the first base station;
    determining if the communications quality value becomes unacceptable, and if so, changing the operating mode of the mobile station to a search operating mode wherein beacon messages received from any of the base stations are monitored;
    selecting one of the base stations which provide an acceptable communications quality value for monitored beacon messages; and
    changing the operating mode of the mobile station to the normal operating mode wherein beacon messages from the selected base station only are monitored,
    wherein the step of selecting one of the base stations which provides an acceptable communications quality value includes the steps of:
        monitoring successively received beacon messages until a beacon message having an acceptable communications quality value is received; and
    selecting the base station providing the beacon message having the acceptable communications quality value, wherein determining if the communications quality value becomes unacceptable includes the steps of:
        comparing the communications quality value with a first predetermined threshold value; and
        identifying the communications quality value as unacceptable if the communications quality value is below the first predetermined threshold value,
    wherein the step of monitoring successively received beacon messages includes the steps of:
        comparing the communications quality value of successively received beacon messages with a second predetermined threshold value; and
        identifying such communications quality value as acceptable if such communications quality value is above the second predetermined threshold value.

2. The method of claim 1, wherein the second predetermined threshold value is greater than the first predetermined threshold value.

3. A method of operating a wireless local area network system having a plurality of base stations and a mobile station, comprising the steps of:
    transmitting beacon messages from the base stations at regular intervals, each beacon message including an identification of the respective base station transmitting that message;
    operating the mobile station in a normal mode wherein beacon messages from a first base station only are monitored;
    determining a communications quality value for the beacon messages from the first base station;
    determining if the communications quality value becomes unacceptable, and if so, changing the operating mode of the mobile station to a search operating mode wherein beacon messages received from any of the base stations are monitored;
    selecting one of the base stations which provide an acceptable communications quality value for monitored beacon messages;
    changing the operating mode of the mobile station to the normal operating mode wherein beacon messages from the selected base station only are monitored; and
    determining a background noise level for each base station and including a representation of the background noise level as a portion of the beacon message transmitted by each base station,
    wherein the step of determining a communications quality value includes the steps of:
        determining a signal strength value for a received beacon message;
        determining a background noise level for the mobile station;

determining the maximum value of the background noise level for the mobile station and the background noise level representation of the base station in the received beacon message; and dividing the signal strength value by the determined maximum value to provide the communications quality value.

4. A method of operating a wireless local area network system having a plurality of base stations which transmit beacon messages to a mobile station, comprising the steps of:

operating the mobile station in a normal mode wherein the mobile station monitors beacon messages from a first base station only;

changing the operating mode of the mobile station to a search operating mode wherein beacon messages received from any of the base stations are monitored if a communications quality value of the beacon messages from the first base station is unacceptable;

selecting one of the base stations which provides an acceptable communications quality value for monitored beacon messages; and changing the operating mode of the mobile station to the normal operating mode wherein beacon messages from the selected base station only are monitored, wherein the step of changing the operating mode of the mobile station to a search operating mode includes the steps of:

determining a communications quality value for the beacon messages from the first base station;

determining if the communications quality value becomes unacceptable, and if so, changing the operating mode of the mobile station to the search operating mode, wherein the step of selecting one of the base stations which provides an acceptable communications quality value includes the steps of:

monitoring successively received beacon messages until a beacon message having an acceptable communications quality value is received;

selecting the base station providing the beacon message having the acceptable communications quality value, wherein the step of determining if the communications quality value becomes unacceptable includes the steps of:

comparing the communications quality value with a first predetermined threshold value; and identifying the communications quality value as unacceptable if the communications quality value is below the first predetermined threshold value, wherein the step of monitoring successively received beacon messages includes the steps of:

comparing the communications quality value of successively received beacon messages with a second predetermined threshold value; and identifying such communications quality value as acceptable if such communications quality value is above the second predetermined threshold value.

5. The method of claim 4, wherein the second predetermined threshold value is greater than the first predetermined threshold value.

6. A method of operating a wireless local area network system having a plurality of base stations which transmit beacon messages to a mobile station, comprising the steps of:

operating the mobile station in a normal mode wherein the mobile station monitors beacon messages from a first base station only;

changing the operating mode of the mobile station to a search operating mode wherein beacon messages received from any of the base stations are monitored if a communications quality value of the beacon messages from the first base station is unacceptable;

selecting one of the base stations which provides an acceptable communications quality value for monitored beacon messages; and changing the operating mode of the mobile station to the normal operating mode wherein beacon messages from the selected base station only are monitored, wherein the step of changing the operating mode of the mobile station to a search operating mode includes the steps of:

determining a communications quality value for the beacon messages from the first base station;

determining if the communications quality value becomes unacceptable, and if so, changing the operating mode of the mobile station to the search operating mode;

determining a background noise level for each base station and including a representation of the background noise level as a portion of the beacon message transmitted by each base station, wherein the step of determining a communications quality value includes the steps of:

determining a signal strength value for a received beacon message;

determining a background noise level for the mobile station;

determining the maximum value of the background noise level for the mobile station and the background noise level representation of the base station in the received beacon message; and dividing the signal strength value by the determined maximum value to provide the communications quality value.

* * * * *